US008561876B2

(12) United States Patent
Yamamoto

(10) Patent No.: US 8,561,876 B2
(45) Date of Patent: Oct. 22, 2013

(54) GOLF CLUB

(75) Inventor: Akio Yamamoto, Kobe (JP)

(73) Assignee: SRI Sports Limited, Kobe (JP)

( * ) Notice: Subject to any disclaimer, the term of this patent is extended or adjusted under 35 U.S.C. 154(b) by 289 days.

(21) Appl. No.: 12/929,578

(22) Filed: Feb. 2, 2011

(65) Prior Publication Data

US 2011/0190071 A1    Aug. 4, 2011

(30) Foreign Application Priority Data

Feb. 3, 2010   (JP) ................................ 2010-021907

(51) Int. Cl.
*B23K 31/02* (2006.01)
*A63B 53/02* (2006.01)
*A63B 53/04* (2006.01)

(52) U.S. Cl.
USPC ............ 228/101; 228/178; 473/305; 473/324

(58) Field of Classification Search
None
See application file for complete search history.

(56) References Cited

U.S. PATENT DOCUMENTS

| 4,438,931 | A | * | 3/1984 | Motomiya | 473/346 |
| 4,597,577 | A | * | 7/1986 | Lamanna | 473/307 |
| 5,232,224 | A | * | 8/1993 | Zeider | 473/345 |
| 5,429,357 | A | * | 7/1995 | Kobayashi | 473/311 |
| 5,575,723 | A | * | 11/1996 | Take et al. | 473/305 |
| 5,704,850 | A | * | 1/1998 | Shieh | 473/324 |
| 5,931,742 | A | * | 8/1999 | Nishimura et al. | 473/305 |
| 5,961,394 | A | * | 10/1999 | Minabe | 473/305 |
| 6,071,200 | A | * | 6/2000 | Song | 473/345 |
| 6,120,384 | A | * | 9/2000 | Drake | 473/248 |
| RE36,950 | E | * | 11/2000 | Allen | 473/314 |
| 6,435,978 | B1 | * | 8/2002 | Galloway et al. | 473/305 |
| 6,475,100 | B1 | * | 11/2002 | Helmstetter et al. | 473/309 |
| 7,621,824 | B2 | * | 11/2009 | Sano | 473/345 |
| 8,403,770 | B1 | * | 3/2013 | Aguinaldo et al. | 473/307 |
| 2001/0001093 | A1 | * | 5/2001 | Murphy et al. | 473/305 |
| 2002/0094880 | A1 | | 7/2002 | McCabe | |
| 2003/0083145 | A1 | * | 5/2003 | Tsurumaki | 473/305 |

(Continued)

FOREIGN PATENT DOCUMENTS

JP    61-33972 Y2    10/1986
JP    61-33973 Y2    10/1986

(Continued)

OTHER PUBLICATIONS

Japanese Office Action, dated Apr. 10, 2012, for Japanese Application No. 2010-021907.

*Primary Examiner* — Kiley Stoner
(74) *Attorney, Agent, or Firm* — Birch, Stewart, Kolasch & Birch, LLP

(57) ABSTRACT

A preferable golf club 2 is provided with a head 4, a shaft 6, a sleeve 8, and a screw 10. The head 4 is provided with a head body 14 and an engaging member 16. The head body 14 is formed by joining a plurality of members. The plurality of members includes a face member 112, a crown member 110, a sole member 114, and a hosel member 116. Preferably, the face member 112, the crown member 110, and the sole member 114 are produced by press processing a rolled material. Preferably, a through hole 130 into which a lower end part of the hosel member 116 can be fitted is formed in the sole member 114. In the golf club 2, the head body 14 and the shaft 6 are detachably mounted to each other without destruction of a bonding agent.

8 Claims, 17 Drawing Sheets

(56) References Cited

U.S. PATENT DOCUMENTS

| | | | |
|---|---|---|---|
| 2003/0119603 A1* | 6/2003 | Yabu | 473/345 |
| 2003/0173342 A1* | 9/2003 | Chiu et al. | 219/121.64 |
| 2004/0097300 A1* | 5/2004 | Lu | 473/342 |
| 2005/0124432 A1* | 6/2005 | Huang et al. | 473/305 |
| 2005/0246884 A1* | 11/2005 | Chen | 29/525 |
| 2006/0293115 A1 | 12/2006 | Hocknell et al. | |
| 2007/0066421 A1* | 3/2007 | Song | 473/345 |
| 2008/0214321 A1* | 9/2008 | Nishitani | 473/345 |
| 2008/0293510 A1 | 11/2008 | Yamamoto | |
| 2009/0011848 A1 | 1/2009 | Thomas et al. | |
| 2009/0275425 A1* | 11/2009 | Hirano | 473/345 |
| 2010/0071193 A1* | 3/2010 | Rice | 29/527.6 |
| 2010/0234136 A1* | 9/2010 | Nishitani | 473/345 |
| 2011/0039631 A1* | 2/2011 | Oldknow et al. | 473/314 |
| 2011/0118045 A1* | 5/2011 | Sato et al. | 473/307 |
| 2011/0263348 A1* | 10/2011 | Sato | 473/307 |
| 2012/0071261 A1* | 3/2012 | Yamamoto | 473/307 |
| 2012/0231896 A1* | 9/2012 | Seluga et al. | 473/314 |
| 2012/0316006 A1* | 12/2012 | Kitagawa et al. | 473/307 |

FOREIGN PATENT DOCUMENTS

| | | |
|---|---|---|
| JP | 6-315550 A | 11/1994 |
| JP | 6-315550 A | 10/2000 |
| JP | 2000-342720 A | 12/2000 |
| JP | 2002-224247 A | 8/2002 |
| JP | 2003-79767 A | 3/2003 |
| JP | 2005-270519 A | 10/2005 |
| JP | 2006-42951 A | 2/2006 |
| JP | 2008-284289 A | 11/2008 |

* cited by examiner

GOLF CLUB

This application claims priority on Patent Application No. 2010-021907 filed in JAPAN on Feb. 3, 2010, the entire contents of which are hereby incorporated by reference.

BACKGROUND OF THE INVENTION

1. Field of the Invention

The present invention relates to a golf club. In particular, the present invention relates to a golf club in which a head and a shaft are detachably mounted to each other.

2. Description of the Related Art

A golf club in which a head and a shaft are detachably mounted to each other has been proposed. Easiness in detachably mounting the shaft to the head body is useful for several reasons. If golf players themselves detachably mount the shaft to the head easily, the golf players can change the head or the shaft easily. For example, golf players who cannot satisfy the performance of the purchased golf club easily change the head or the shaft by themselves. The golf players themselves can easily assemble an original golf club in which a favorite head and a favorite shaft are combined. The golf players can purchase the favorite head and the favorite shaft, and can assemble the head and the shaft by themselves. Stores which sell the golf clubs can select the combination of the head and the shaft properly corresponding the golf player, and sell the combination. The head and the shaft detachably mounted easily facilitate the custom-made golf club.

The golf club is also suitable in the evaluation of the head or the shaft. For example, when the comparative test of three kinds of shafts is conducted, a highly precise comparative test can be conducted by mounting the same kind of head to three kinds of shafts. When different heads are mounted to the same shaft, a comparative test of the head can be conducted with high precision.

U.S. Patent Application No. 2009/0011848, U.S. Patent Application No. 2006/0293115, Japanese Patent Application Laid-Open No. 2008-284289 and Japanese Patent Application Laid-Open No. 2006-42951 disclose a structure in which a shaft is detachably mounted to a head easily. FIGS. 9A and 9B or the like of U.S. Patent Application No. 2009/0011848 disclose a golf club capable of adjusting an angle of a shaft to a head.

SUMMARY OF THE INVENTION

Angle adjustment utilizing an angle between a hosel axis and a shaft axis has limitations. When the angle between the hosel axis and the shaft axis is increased, the mass of a hosel part is apt to become excessive.

It is an object of the present invention to provide a golf club capable of adjusting an angle in a wide range.

A golf club of the present invention is provided with a head body and a shaft. The head body and the shaft are detachably mounted to each other without destruction of a bonding agent. The head body is formed by joining a plurality of members. The plurality of members includes a face member, a crown member, a sole member, and a hosel member having a hosel hole.

Preferably, the face member, the crown member, and the sole member are produced by press processing a rolled material.

Preferably, a through hole into which a lower end part of the hosel member can be fitted is formed in the sole member.

Preferably, an angle of the hosel member to the sole member can be adjusted according to a position of the through hole.

A preferable golf club is further provided with a sleeve. Preferably, the sleeve is fixed to a tip part of the shaft, and at least a part of the sleeve is inserted into the hosel hole. Preferably, an axis line of the shaft is inclined to the axis line of the hosel hole. Preferably, the sleeve can be mounted to the hosel hole at a plurality of circumferential positions.

A manufacturing method of the present invention is a method for manufacturing a golf club head used for a golf club in which a head body and a shaft are detachably mounted to each other without destruction of a bonding agent. The method comprises: a first step of welding a face member and another member A to each other to obtain a joined body with a relative angle between members measured; and a second step of welding a remaining member to the joined body obtained by the first step. Preferably, welding in the first step includes local welding.

Another manufacturing method of the present invention is a method for manufacturing a golf club head used for a golf club in which a head body and a shaft are detachably mounted to each other without destruction of a bonding agent. The method comprises: a former step of welding a hosel member and another member B to each other to obtain a joined body with a relative angle between members measured; and a subsequent step of welding a remaining member to the joined body obtained by the former step.

Preferably, welding in the former step includes local welding.

Still another manufacturing method of the present invention is a method for manufacturing a golf club head used for a golf club in which a head body and a shaft are detachably mounted to each other without destruction of a bonding agent. The method comprises the steps of: locally welding a face member and a sole member to each other to obtain a joined body X with an original loft angle measured; locally welding the joined body X and a hosel member to each other to obtain a joined body Y with one or more specifications selected from the group consisting of the original loft angle, a lie angle, and a hook angle measured; welding a crown member to the joined body Y to obtain a joined body Z; and additionally welding a locally welded portion of the joined body Z.

Preferably, the sole member has a through hole. Preferably, the step of obtaining the joined body Y comprises the steps of: fitting a lower end part of the hosel member into a through hole of the sole member to position the hosel member; and welding the hosel member and the sole member to each other with the hosel member positioned.

Yet still another manufacturing method of the present invention is a method for manufacturing a golf club head used for a golf club in which a head body and a shaft are detachably mounted to each other without destruction of a bonding agent. The method comprises the steps of: preparing a member having a hosel hole and a member having a through hole; fitting a lower end part of the member having the hosel hole into the through hole; and welding the member having the hosel hole and the member having the through hole to each other with the lower end part of the member having the hosel hole fitted into the through hole.

Preferably, a sole hole is formed in a sole part. Preferably, the head body and the shaft are detachably mounted to each other by a screw inserted from the sole hole. Preferably, the sole hole is formed by utilizing the through hole.

DESCRIPTION OF THE PREFERRED EMBODIMENTS

Hereinafter, the present invention will be described below in detail based on preferred embodiments with reference to the drawings.

Figure 1:
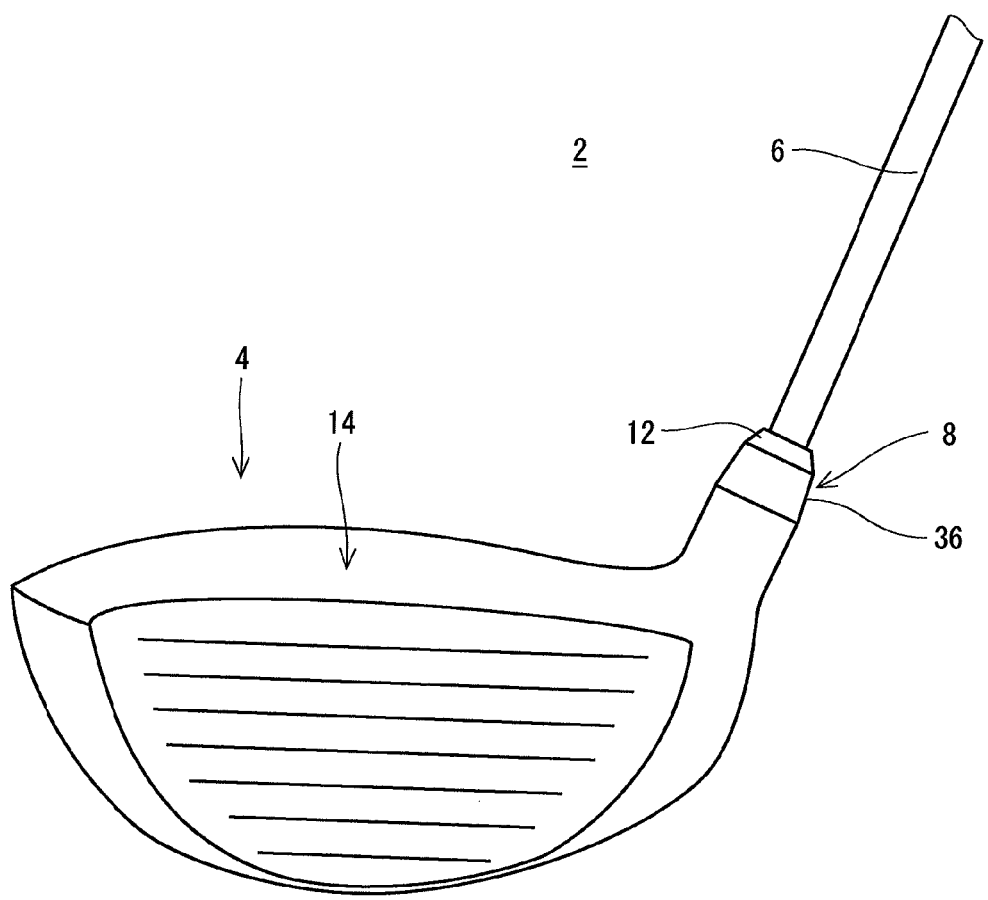
FIG. 1 is a view showing a golf club according to one embodiment of the present invention.
Figure 2:
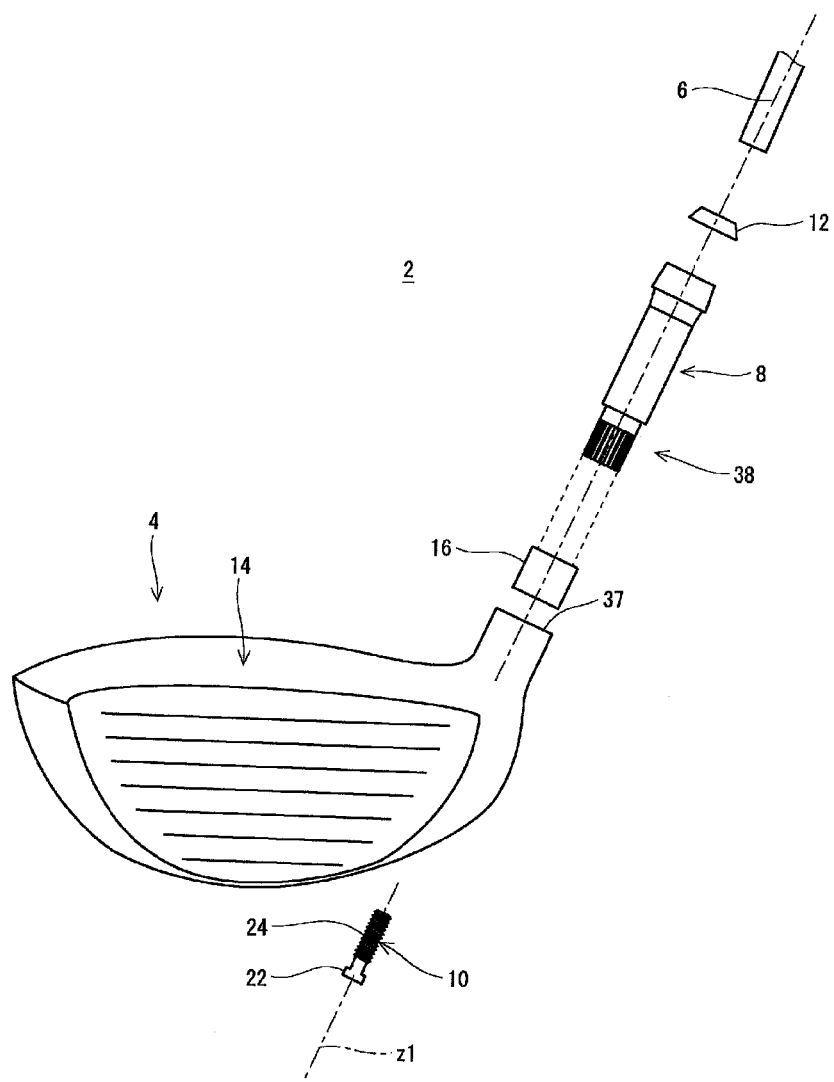
FIG. 2 is an exploded view of FIG. 1.
Figure 3:
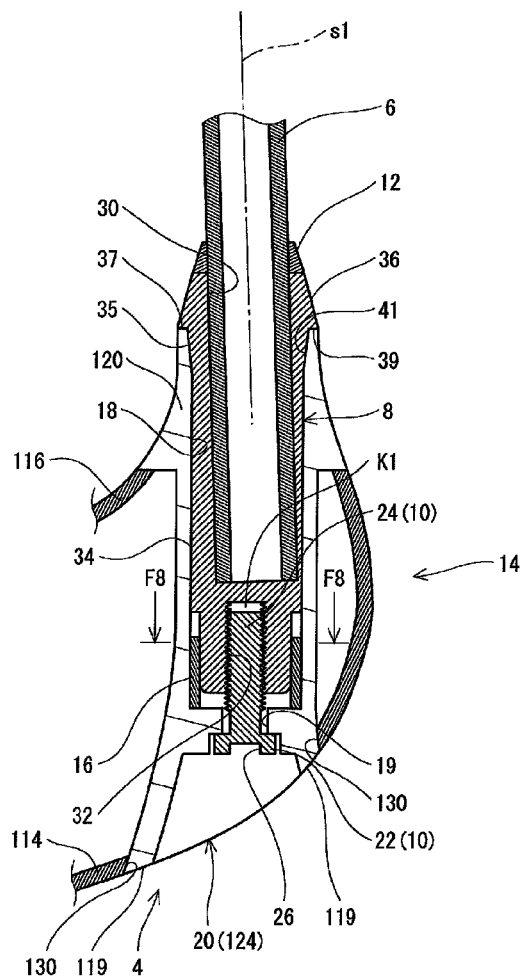
FIG. 3 is a sectional view of FIG. 1.

FIG. 1 shows only a vicinity of a head of a golf club 2. FIG. 2 is an exploded view of the golf club 2. FIG. 3 is a sectional view of the golf club 2. FIG. 3 is a sectional view along a center axis line of a sleeve 8.

The golf club 2 has a head 4, a shaft 6, a sleeve 8, a screw 10, and a ferrule 12. The sleeve 8 is fixed to a tip of the shaft 6. A grip (not shown) is mounted to a back end of the shaft 6.

The head 4 has a head body 14 and an engaging member 16. The head body 14 has a hosel hole 18 into which the sleeve 8 is inserted, and a through hole 19 into which the screw 10 is inserted. The through hole 19 passes through a bottom part of the hosel hole 18. The head body 14 has a sole hole 20 opened in a sole (see FIG. 3). The sole hole 20 and the hosel hole 18 are continued through the through hole 19. The head body 14 has a hollow part.

The type of the head 4 is not restricted. The head 4 of the embodiment is a wood type golf club. The head 4 may be a utility type head, a hybrid type head, an iron type head, and a putter head or the like.

The shaft 6 is not restricted. A generalized carbon shaft, and a steel shaft or the like can be used.

The screw 10 has a head part 22 and an axis part 24 (see FIG. 2). The screw 10 passes through the through hole 19 from the sole hole 20, and reaches to a screw hole 32 (to be described later). The axis part 24 is connected to the sleeve 8 in a screwing manner (to be described in detail later). The head part 22 has a concave part 26 for a wrench (see FIG. 3). The screw 10 located in the head body 14 can be axially rotated by using the wrench (a hexagonal wrench, and a dedicated wrench or the like) fitted into the concave part 26. This axial rotation enables attachment and detachment of the sleeve 8.

The engaging member 16 is fixed to the head body 14 (see FIG. 3). The fixing method is not restricted. As the fixing method, bonding, welding, fitting, and a combination thereof are exemplified. The engaging member 16 is put into the hosel hole 18 from an upper side opening of the hosel hole 18. The engaging member 16 is fixed to a bottom part of the hosel hole 18.

The engaging member 16 has a rotation-preventing part. The rotation-preventing part is formed in the inner surface of the engaging member 16. The rotation-preventing part will be described later.

Figure 4:
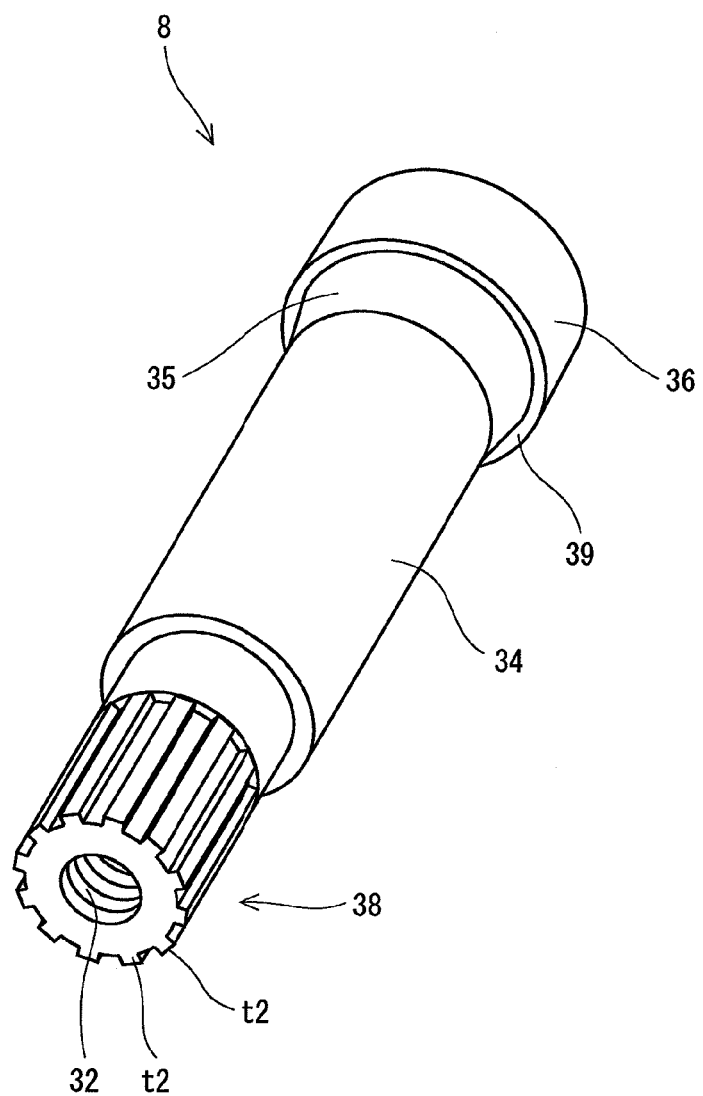
FIG. 4 is a perspective view showing an example of a sleeve.
Figure 5:
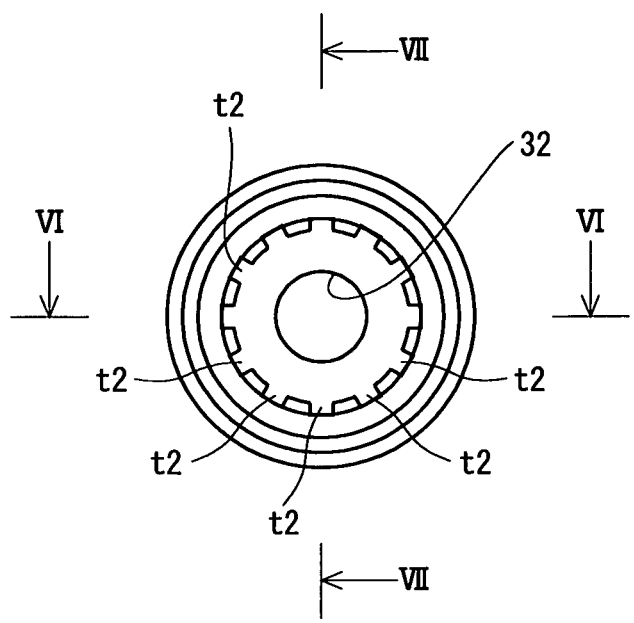
FIG. 5 is a bottom view of the sleeve of FIG. 4.
Figure 6:
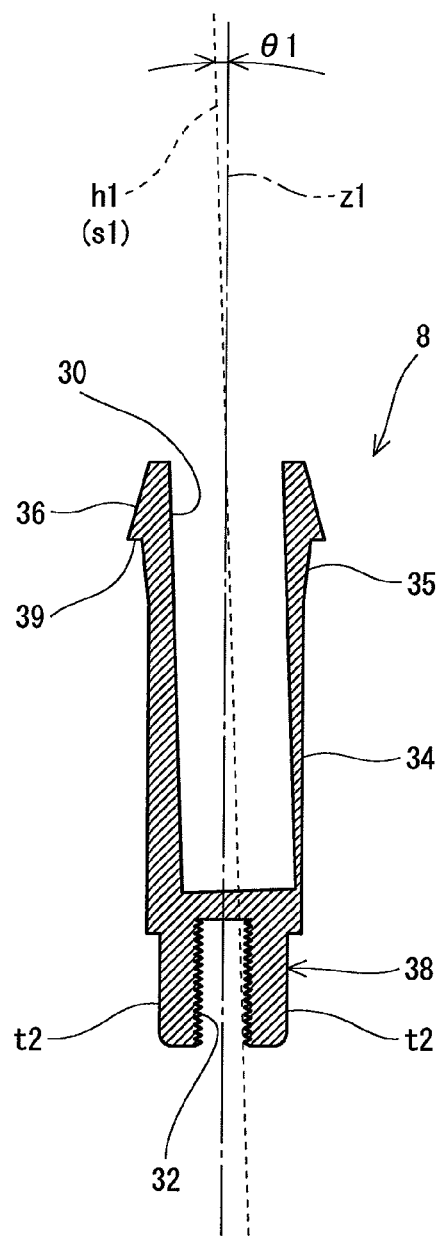
FIG. 6 is a sectional view taken in line VI-VI of FIG. 5.
Figure 7:
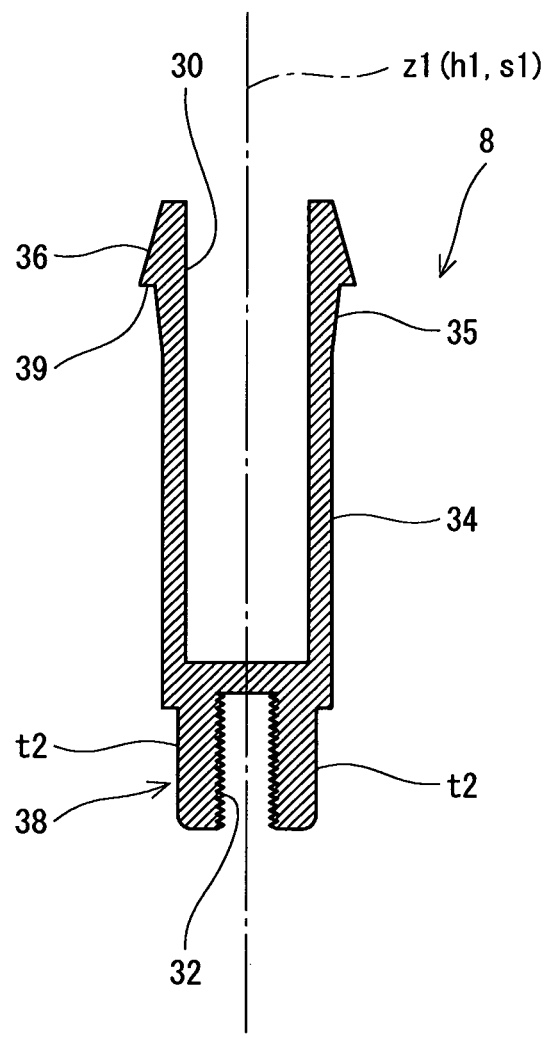
FIG. 7 is a sectional view taken in line VII-VII of FIG. 5.

FIG. 4 is a perspective view of the sleeve 8. FIG. 5 is a bottom view of the sleeve 8. FIG. 6 is a sectional view taken in line VI-VI of FIG. 5. FIG. 7 is a sectional view taken in line VII-VII of FIG. 5.

The sleeve 8 has a shaft hole 30 and the screw hole 32 (FIGS. 6 and 7). The shaft hole 30 is opened to one side (an upper side). The screw hole 32 is opened to other side (a lower side). The screw hole 32 is disposed on the lower side of the shaft hole 30.

The sleeve 8 further has a definite-diameter circumferential surface 34, an inclined surface 35, an exposed surface 36, and a rotation-preventing part 38. The definite-diameter circumferential surface 34 is a portion having a fixed outer diameter. A bump surface 39 exists on the lower end of the exposed surface 36.

In a state where the shaft is mounted (see FIGS. 1 and 3), the exposed surface 36 is exposed to the outside. An outer diameter of a lower end of the exposed surface 36 is substantially equal to an outer diameter of a hosel end surface 37. An outer diameter of an upper end of the exposed surface 36 is substantially equal to an outer diameter of a lower end of the ferrule 12. The exposed surface 36 and the ferrule 12 look like a conventional ferrule as a whole. The exposed surface 36 enhances appearance.

A lower portion of the sleeve 8 than the exposed surface 36 is inserted into the hosel hole 18 (see FIG. 3). A shape of the inclined surface 35 corresponds to a shape of a chamfering part 41 of the hosel hole 18 (see FIG. 3).

As shown in FIG. 6, an axis line h1 of the shaft hole 30 is inclined to an axis line z1 of an outer surface of the sleeve. The inclination angle $\theta 1$ is a maximum value of an angle between the axis line h1 and the axis line z1. The axis line z1 coincides with a center axis line of the definite-diameter circumferential surface 34. The axis line z1 is substantially equal to an axis line of the hosel hole 18. The axis line h1 of the shaft hole 30 is substantially equal to an axis line s1 of the shaft 6.

The shaft 6 is fixed to the shaft hole 30. The fixation is achieved by bond using a bonding agent. An outer surface of the shaft 6 is bonded to an inner surface of the shaft hole 30. The shaft 6 may be fixed to the shaft hole 30 by means other than bond.

The prevention of coming off of the sleeve 8 is achieved by screw connection. As shown in FIG. 3, the screw hole 32 of the sleeve 8 is connected to the screw 10 in a screwing manner. The screw connection prevents the coming off of the sleeve 8. An axial force caused by the screw connection is balanced with pressure between the hosel end surface 37 and the bump surface 39. In order to collateralize the axial force, a clearance K1 exists between a tip of the screw 10 and a bottom surface of the screw hole 32 in a state where the screw connection is completed (see FIG. 3).

The rotation-preventing part 38 of the sleeve 8 has twelve convex parts t2. The convex parts t2 are equally disposed in a circumferential direction. That is, the convex parts t2 are disposed at every 30 degrees.

The rotation-preventing part 38 has rotational symmetry with the axis line z1 as a rotational symmetric axis. The rotational symmetry implies that the shape of the rotation-preventing part 38 rotated by (360/W) degrees around the rotational symmetric axis coincides with that of the unrotated rotation-preventing part 38. W is an integer of equal to or greater than 2. The coincidence of the shape of the rotation-preventing part 38 rotated by (360/W) degrees around the rotational symmetric axis with that of the unrotated rotation-preventing part 38 is also referred to as "W-fold rotation symmetry". The rotation-preventing part 38 has twelve-fold rotation-symmetry with respect to the axis line z1.

Figure 8:
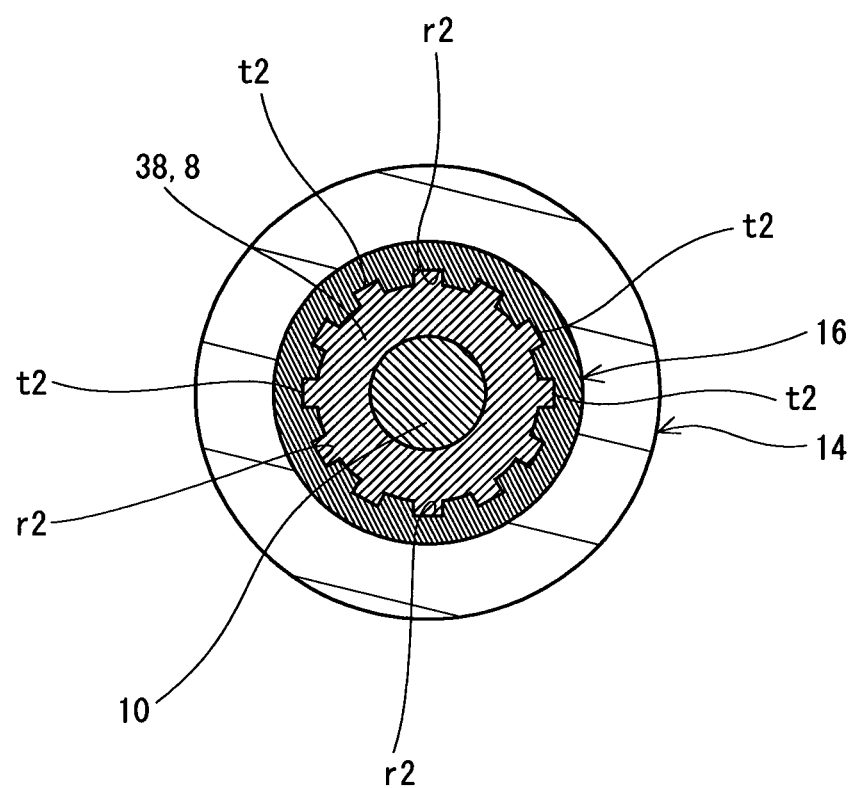
FIG. 8 is a sectional view taken in line F8-F8 of FIG. 3.

FIG. 8 is a sectional view taken in line F8-F8 of FIG. 3.

An outer surface of the engaging member 16 is a circumferential surface having a fixed outer diameter. On the other hand, a rotation-preventing part 48 is provided inside of the engaging member 16. The rotation-preventing part 48 is formed by twelve concave parts r2. The concave parts r2 are disposed at equal intervals in a circumferential direction. The engaging member 16 may be integrally formed as a part of the head body 14.

The rotation-preventing part 48 has rotational symmetry with the axis line z1 as a rotational symmetric axis. The rotation-preventing part 48 has twelve-fold rotation-symmetry with respect to the axis line z1. The shape of the rotation-preventing part 48 corresponds to the shape of the rotation-preventing part 38.

The engaging member 16 formed independently from the head body 14 can be formed with high dimensional accuracy. For example, the engaging member 16 formed independently from the head body 14 can be easily cut. Independent formation of the engaging member 16 from the head body 14 can contribute to improvement in dimensional accuracy of the rotation-preventing part 48 of the engaging member 16.

The rotation stop of the sleeve 8 is achieved by the engagement of the rotation-preventing part 38 and the rotation-preventing part 48. The rotation-preventing part 38 and the rotation-preventing part 48 are engaged with each other so that the relative rotation of the head 4 and the shaft 6 is regulated.

The circumferential relative positions in which the rotation-preventing part 38 and the rotation-preventing part 48 can be engaged with each other are twelve kinds. When the circumferential relative positions are altered, a loft angle, a lie angle, and a hook angle can be changed. The changes of the angles are due to the inclination angle θ1. In the embodiment, the loft angle, the lie angle and the hook angle can be adjusted due to twelve kinds of circumferential relative positions. The loft angle, the lie angle, and the hook angle suitable for each of golf players can be selected.

The number of the circumferential relative positions in which the rotation-preventing part 38 and the rotation-preventing part 48 can be engaged with each other is not restricted to twelve kinds. Four kinds, five kinds, six kinds, and eight kinds or the like are exemplified.

When a shaft is removed from a head in the general golf club, a bonding agent bonding both the shaft and the head is destroyed by heating. However, in the golf club 2, the head body 14 and shaft 6 are detachably mounted to each other without destruction of the bonding agent.

Figure 9:
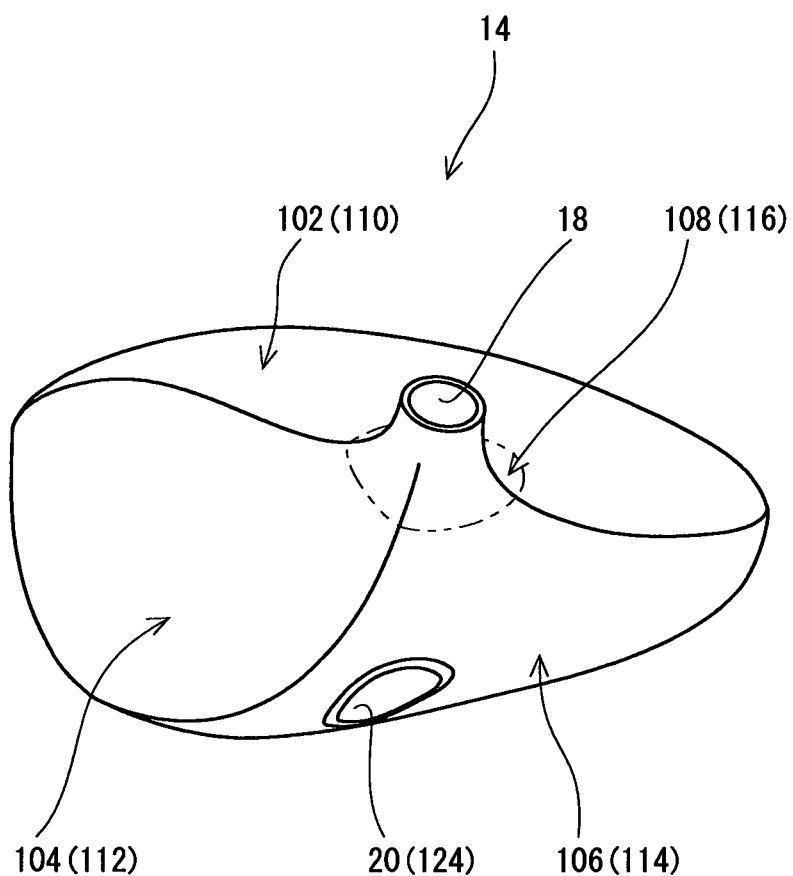
FIG. 9 is a perspective view showing an example of a head body.
Figure 10:
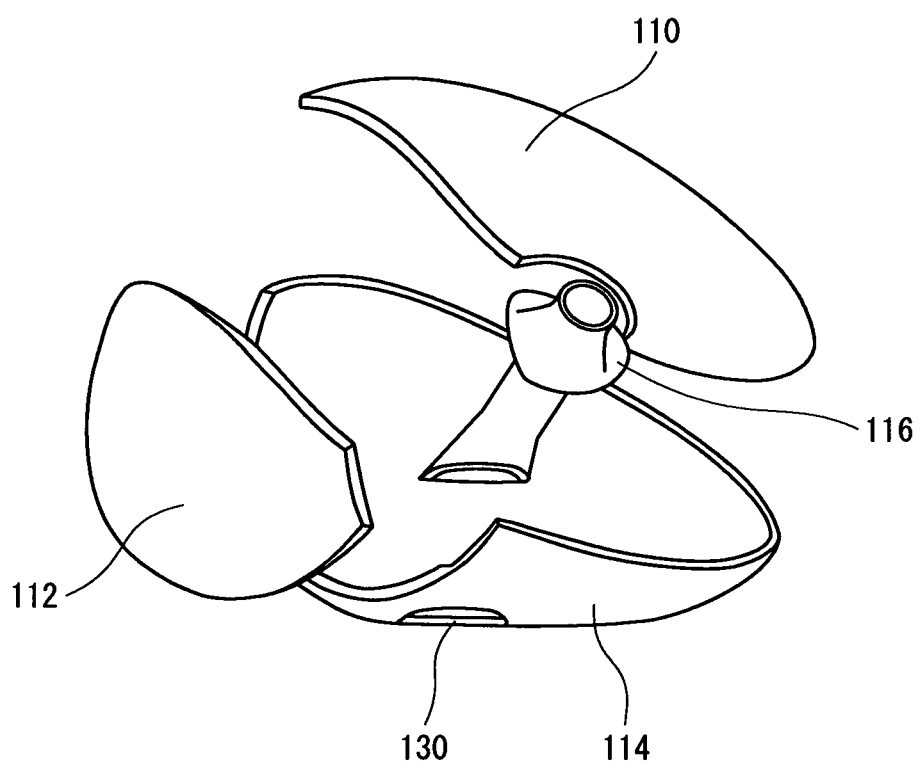
FIG. 10 is an exploded view of the head body of FIG. 9.

FIG. 9 is a perspective view of the head body 14. FIG. 10 is an exploded view of the head body 14.

As shown in FIG. 9, the head body 14 has a crown 102, a face 104, a sole 106, and a hosel 108. The head body 14 may further have a side.

As shown in FIG. 10, the head body 14 is formed by joining a plurality of members. The plurality of members is a crown member 110, a face member 112, a sole member 114, and a hosel member 116.

The crown member 110 constitutes at least a part of the crown 102. Preferably, the crown member 110 substantially constitutes the whole of the crown 102.

The face member 112 constitutes at least a part of the face 104. Preferably, the face member 112 substantially constitutes the whole of the face 104.

The sole member 114 constitutes at least a part of the sole 106. Preferably, the sole member 114 substantially constitutes the whole of the sole 106.

The hosel member 116 constitutes at least a part of the hosel hole 18. Preferably, the hosel member 116 constitutes the whole of the hosel hole 18.

A boundary between the hosel member 116 and another members is shown by a two-dot chain line in FIG. 9.

The crown member 110, the face member 112, the sole member 114, and the hosel member 116 are joined to form the head body 14. The junction is welding.

Figure 11:
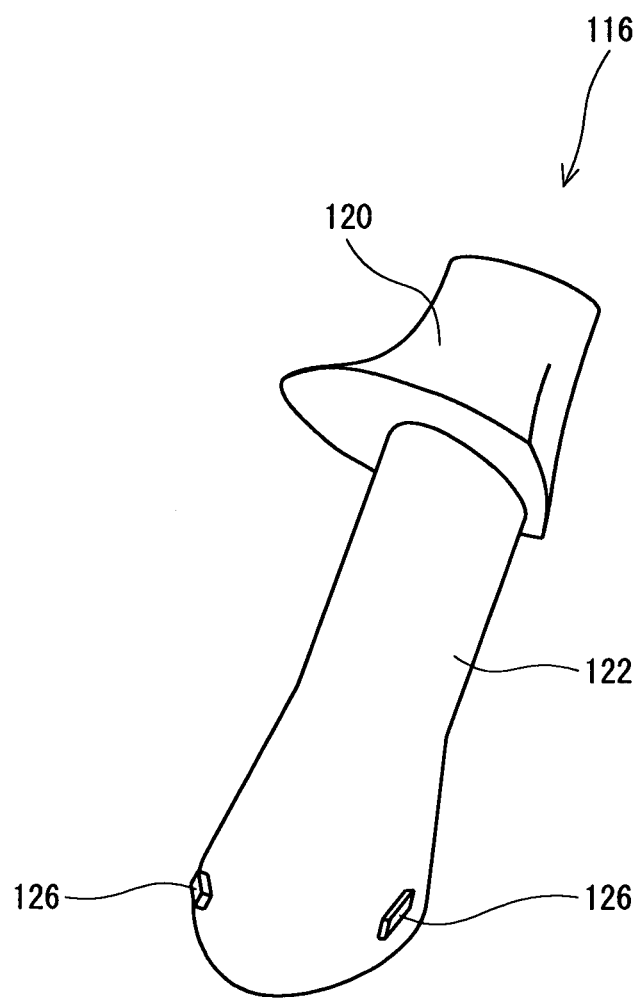
FIG. 11 is a perspective view of a hosel member.

FIG. 11 is a perspective view of the hosel member 116. The hosel member 116 has an upper part 120 and a lower part 122. The hosel member 116 has a long hole 124 provided therethrough. The long hole 124 includes the hosel hole 18 and the through hole 19. A lower part of the long hole 124 is flared toward the lower portion (see FIG. 3). The long hole 124 forms the sole hole 20. Although not shown in FIG. 11, the hosel hole 18 is formed continuously from the upper part 120 to the lower part 122. The hosel hole 18 forms an inner surface of the upper part 120 and an inner surface of the lower part 122.

An outer surface of the upper part 120 is smoothly continued to an outer surface of the crown 102. The outer surface of the upper part 120 is smoothly continued to an outer surface of the face 104. The outer surface of the upper part 120 is smoothly continued to the sole 106. The continuity thereof is achieved by a surface polishing step as a finishing step of the head body 14.

The lower part 122 is located in the head body 14. In the head body 14, an outer surface of the lower part 122 is invisible from the outside. A lower end surface of the lower part 122 forms a part of the sole 106.

As shown in FIG. 11, projections 126 are provided on the outer surface of the lower part 122. In the embodiment, the number of the projections 126 is two. The projections 126 play a part in positioning. The positioning will be described later.

Figure 12:
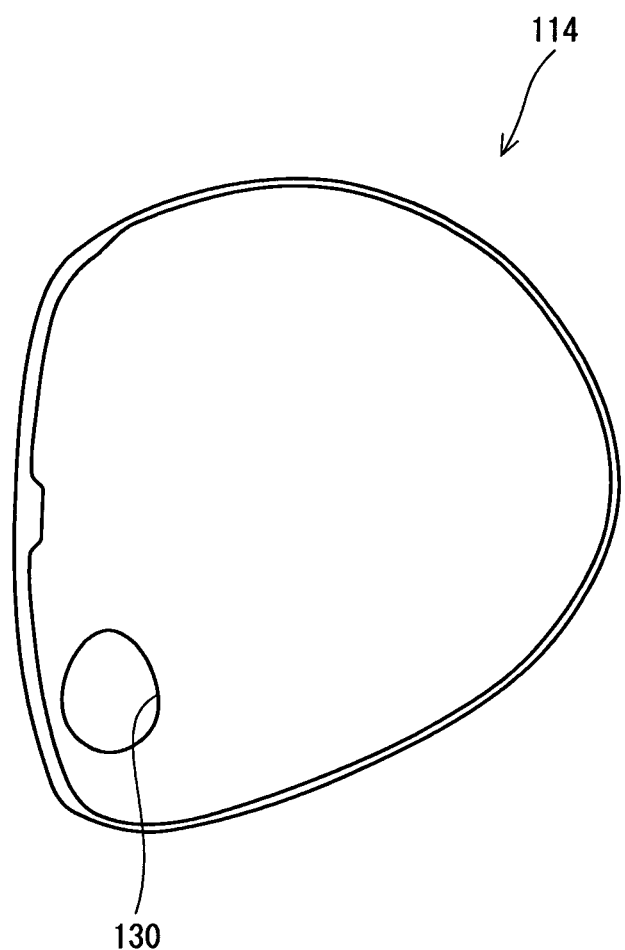
FIG. 12 is a plan view of a sole member.

FIG. 12 is a plan view of the sole member 114. FIG. 12 shows the sole member 114 viewed from the inner surface side thereof. The sole member 114 has a through hole 130. An inner surface of the through hole 130 is brought into contact with the outer surface of the lower part 122.

Figure 13:
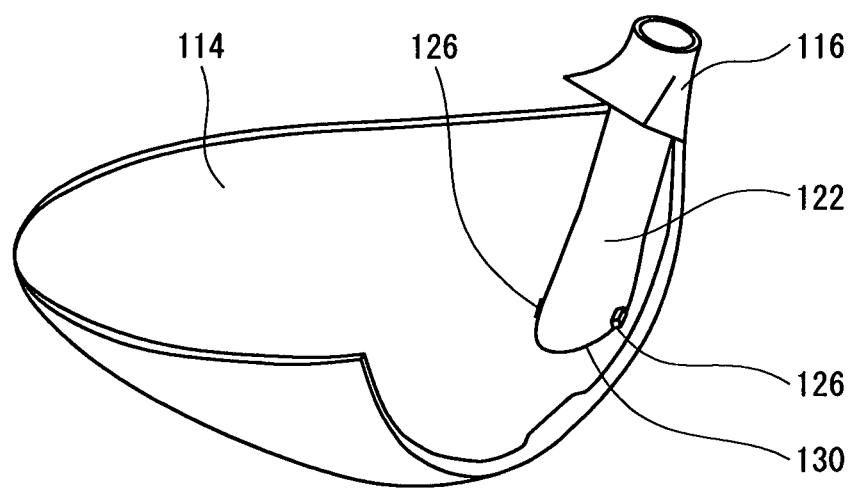
FIG. 13 is a perspective view showing a state where the sole member and the hosel member are combined.

FIG. 13 is a perspective view showing a state where the hosel member 116 and the sole member 114 are joined. A lower end part of the hosel member 116 is fitted into the through hole 130 of the sole member 114. An outer surface shape of the lower end part of the hosel member 116 corresponds to a shape of the through hole 130.

As shown in FIG. 3, the sole hole 20 is formed by utilizing the through hole 130. The through hole 130 plays a part in forming the sole hole 20 and a part in positioning the hosel member 116.

As shown in FIG. 13, the projections 126 are brought into contact with an inner surface of the sole member 114. The hosel member 116 is positioned to the sole member 114 by bringing the projections 126 into contact with the inner surface of the sole member 114.

Figure 14:
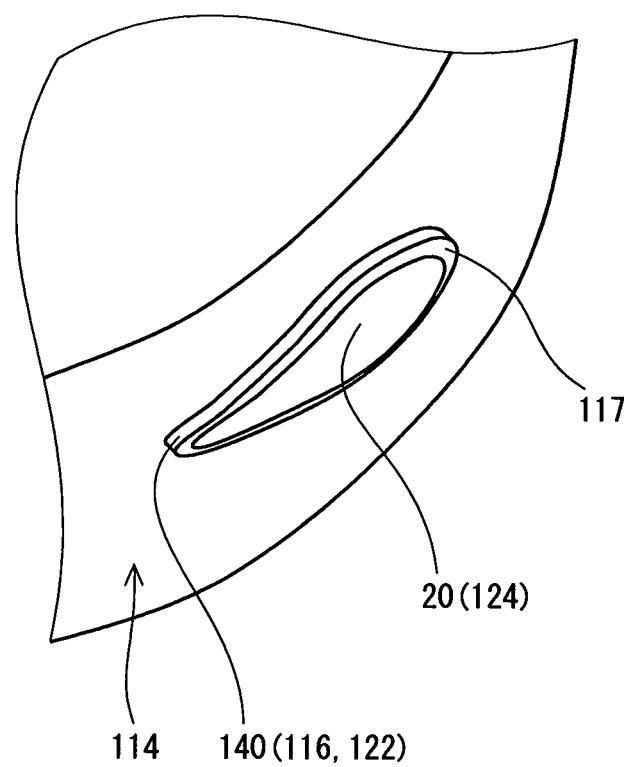
FIG. 14 is an enlarged perspective view of a vicinity of a sole hole.

FIG. 14 shows a state where the lower end part of the hosel member 116 is fitted into the sole member 114, as viewed from the sole side. In the state where the hosel member 116 is positioned, the lower part 122 of the hosel member 116 forms a projection part 140 outwardly extending from an outer surface of the sole member 114. The projection part 140 is eventually removed by polishing or the like. In the completed head body 14, the outer surface of the sole member 114 and a lower end surface 119 (polished lower end surface) of the hosel member 116 are made flush by the removal. That is, in the completed head body 14, the outer surface of the sole member 114 and the lower end surface 119 of the hosel member 116 are smoothly continued (see FIG. 3). The smooth continuous surface enhances appearance, and raises a commodity value.

The projection part 140 provides cutting margin for enhancing the appearance of a sole surface. The presence of the projection part 140 enhances flexibility (degree of freedom) in a mounting angle A1 of the hosel member 116 to the sole member 114. When the projection part 140 is not present, variation of the mounting angle A1 may cause a state where a part of a lower end surface 117 (unpolished lower end surface) of the hosel member 116 is located inside the sole surface. The state implies that a bump D1 which is hard to be eliminated by polishing is generated between the lower end surface 117 of the hosel member 116 and the sole surface. The bump D1 causes the poor appearance. The presence of the projection part 140 suppresses the generation of the bump D1 caused by the variation of the mounting angle A1. In respect of the flexibility (degree of freedom) of the mounting angle A1, a projection height of the projection part 140 is preferably equal to or greater than 0.5 mm, and more preferably equal to or greater than 1 mm. In respect of suppressing a polishing amount, the projection height of the projection part 140 is preferably equal to or less than 3 mm, and more preferably equal to or less than 2 mm. The positions of the projections 126 are preferably determined in consideration of the projection height of the projection part 140.

The crown member 110 is produced by processing a rolled material. The face member 112 is produced by processing the rolled material. The sole member 114 is produced by processing the rolled material. The rolled material has excellent strength and thickness accuracy. The rolled material has few defects.

The crown member 110 is produced by press processing the rolled material. The face member 112 is produced by press processing the rolled material. The sole member 114 is produced by press processing the rolled material. The hosel member 116 is produced by, for example, NC processing or casting. A member manufactured by press processing the rolled material has excellent strength and thickness accuracy. The member manufactured by press processing the rolled material contributes to weight-reduction. The member manufactured by press processing the rolled material contributes to cost reduction. In respect of forming accuracy, a processing temperature in press processing is preferably equal to or greater than 800° C., and preferably equal to or less than 900° C.

In respect of enabling a manufacturing method to be described later, preferably, the sole member 114 and the face member 112 can be welded to each other. In respect of enabling the manufacturing method to be described later, preferably, the sole member 114 and the hosel member 116 can be welded to each other. In respect of enabling the manufacturing method to be described later, preferably, the crown member 110 and the face member 112 can be welded to each other. In respect of enabling the manufacturing method to be described later, preferably, the crown member 110 and the sole member 114 can be welded to each other.

Figure 15:
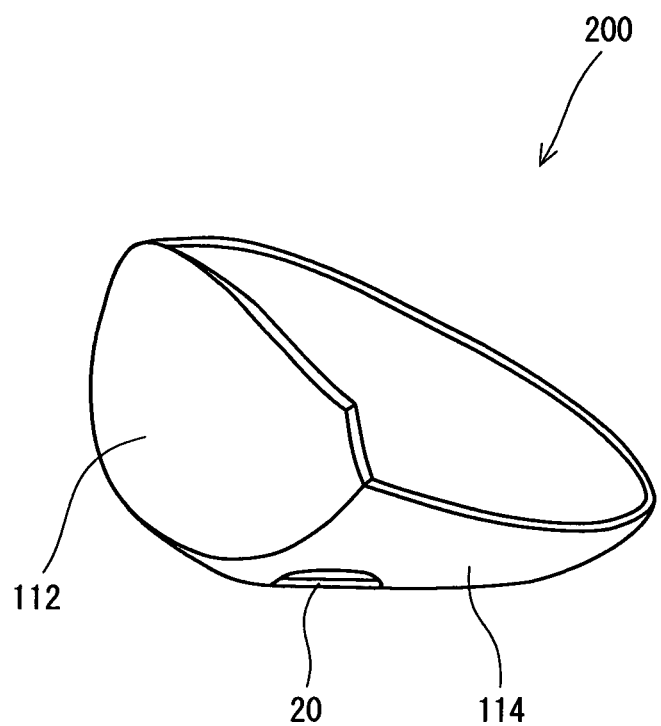
FIG. 15 is a perspective view showing an example of a joined body.
Figure 16:
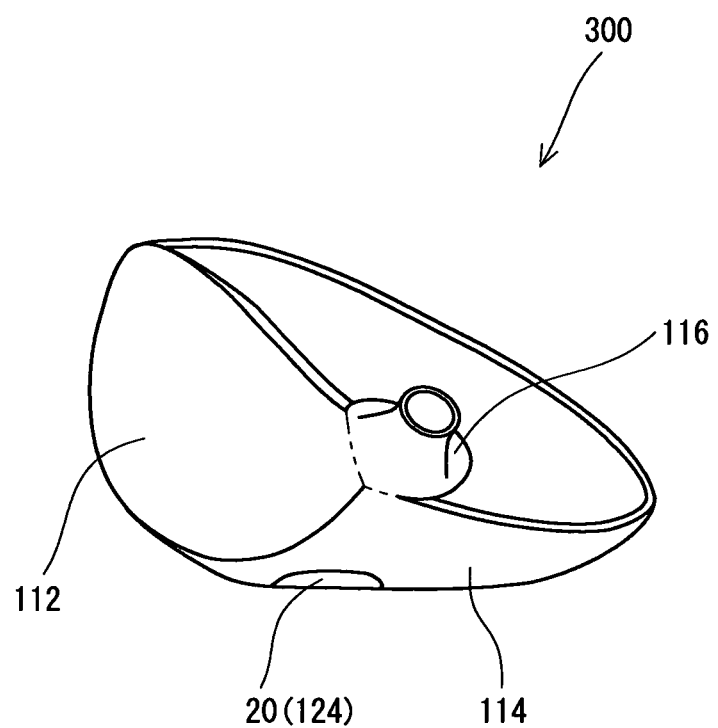
FIG. 16 is a perspective view showing another example of the joined body.
Figure 17:
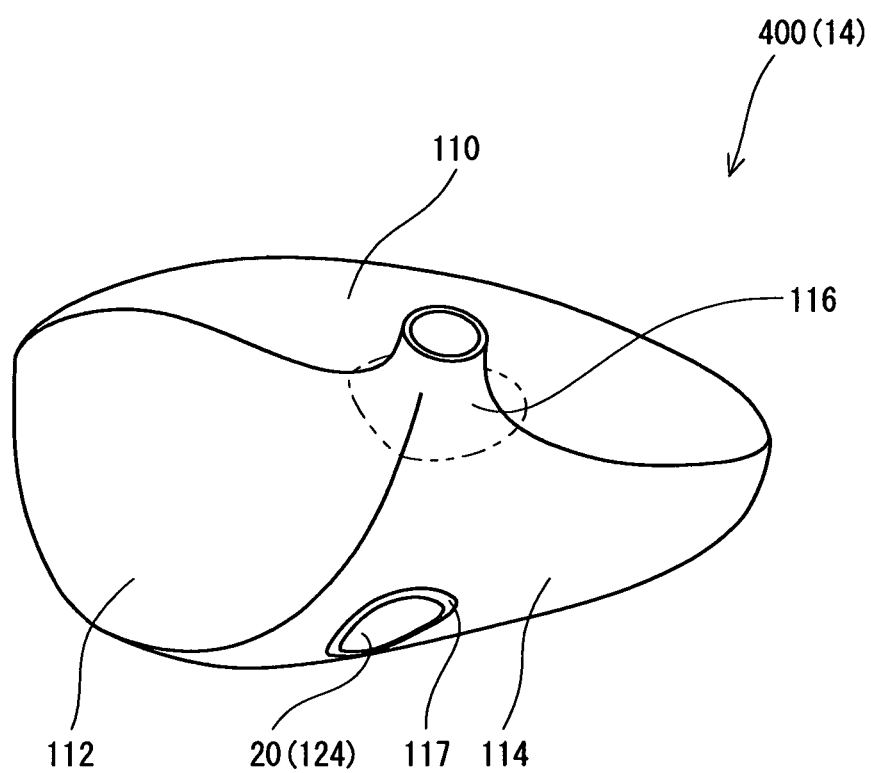
FIG. 17 is a perspective view showing another example of the joined body.

FIGS. 15, 16, and 17 are perspective views for describing a preferable manufacturing method of the head body 14.

The preferable manufacturing method includes a first step and a second step.

The first step welds the face member 112 and another member A to each other with a relative angle between members measured. The relative angle between members is a relative angle between different members. The relative angle between members is, for example, an angle between the face member 112 and the another member A. As long as the relative angle is present, a measurement position or the like of an angle is not restricted.

Preferably, the another member A includes at least a part of the sole. The another member A may include the whole of the sole. The another member A is preferably the sole member 114. The relative angle between members is preferably an original loft angle. The original loft angle can be easily measured. The original loft angle has high correlation with a real loft angle. The original loft angle is close to the real loft angle. Welding conducted while measuring the original loft angle facilitates management of the real loft angle. The welding conducted while measuring the original loft angle enhances accuracy of the real loft angle.

In the first step of the embodiment, the face member 112 and the sole member 114 are welded to each other. A joined body 200 shown in FIG. 15 is produced by the welding. Preferably, the welding is local welding.

In the second step, remaining members are welded to the joined body 200 obtained by the first step. In the embodiment, the remaining members are the hosel member 116 and the crown member 110. In the embodiment, in the second step, a joined body 400 shown in FIG. 17 is produced through a joined body 300 shown in FIG. 16. Preferably, the joined body 400 is additionally welded.

A more preferable manufacturing method includes the following step S1, step S2, step S3, and step S4.

(Step S1) a step of locally welding the face member 112 and the sole member 114 to each other to obtain a joined body X with the original loft angle measured.

(Step S2) a step of locally welding the joined body X and the hosel member 116 to each other to obtain a joined body Y with one or more specifications selected from the group consisting of the original loft angle, the lie angle, and the hook angle measured.

(Step S3) a step of welding the crown member 110 to the joined body Y to obtain a joined body Z.

(Step S4) a step of additionally welding the locally welded portion of the joined body Z.

The local welding is preferably spot welding. In the case of the local welding, the angle between the members is easily changed even after welding. The local welding facilitates adjustment of the original loft angle. The local welding facilitates adjustment of the lie angle. The local welding facilitates adjustment of the hook angle.

When the spot welding is conducted at one place, the flexibility of deformation is too great, and excessive deformation may be generated. The excessive deformation may lower accuracy of angle adjustment. In respect of suppressing the excessive deformation, the spot welding is preferably conducted at two or more places.

In the step S1 and the step S2, since all the members constituting the head body 14 are not joined, restraint to deformation is weak. Therefore, in the step S1 and step S2, it is easy to adjust the angle between the members. The local welding further facilitates the adjustment of the angle. Therefore, the local welding is particularly effective in the step S1 and the step S2. Of course, the welding of the step S3 may be the local welding.

In the embodiment, the joined body 200 shown in FIG. 15 corresponds to the joined body X. In the embodiment, the joined body 300 shown, in FIG. 16 corresponds to the joined body Y. In the embodiment, the joined body 400 shown in FIG. 17 corresponds to the joined body Z.

In a preferable manufacturing method, the sole member 114 has the through hole 130 (see FIG. 12). The lower end part of the hosel member 116 can be fitted into the through hole 130. In a preferable manufacturing method, a step (step S2) of obtaining the joined body Y includes the following step S21 and step S22.

(Step S21) a step of fitting the lower end part of the hosel member 116 into the through hole 130 of the sole member 114 to position the hosel member 116.

(Step S22) a step of welding the hosel member 116 and the sole member 114 to each other with the hosel member 116 positioned.

In this case, since the hosel member 116 and the sole member 114 are welded to each other with the hosel member 116 positioned by the through hole 130, position accuracy is enhanced. Since the relative angle between the hosel member 116 and the sole member 114 can be adjusted with the hosel member 116 positioned by the through hole 130, fine angle adjustment can be easily conducted.

In the step S21, the sole member 114 and the hosel member 116 are in a state shown in FIG. 13. Preferably, in the step S21, the projections 126 are used. Preferably, in the step S21, the projections 126 are brought into contact with the inner surface of the sole member 114 to position the hosel member 116. The projections 126 further enhance positioning accuracy.

Preferably, the relative angle between the sole member 114 and the hosel member 116 is adjusted with the projections 126 brought into contact with the inner surface of the sole member 114. In this case, the angle can be adjusted while high positioning accuracy is secured.

Preferably, the angle of the hosel member 116 to the sole member 114 is adjusted according to the position of the through hole 130. In this case, the fine angle adjustment can be conducted, and the accuracy of the angle adjustment is enhanced.

Another preferable manufacturing method includes a former step of welding a hosel member and another member B to each other with a relative angle between members measured, and a subsequent step of welding a remaining member to the joined body obtained by the former step. The another member B is a member other than the hosel member. In the manufacturing method, in the former step, an angle between the hosel member and the another member B can be adjusted. In respect of the angle adjustment, preferably, the welding of the former step includes local welding.

Another preferable manufacturing method includes the steps of: preparing a member having a hosel hole and a member having a through hole; fitting a lower end part of the member having the hosel hole into the through hole; and welding the member having the hosel hole and the member having the through hole to each other with the lower end part of the member having the hosel hole fitted into the through hole. In the manufacturing method, angle adjustment between the member having the hosel hole and the member having the through hole can be conducted with high accuracy. A typical example of the member having the hosel hole is the hosel member 116. A typical example of the member having the through hole is the sole member 114 described above.

Since the embodiment enables the angle adjustment in the step of welding, a sufficient adjustment range can be secured even if a width of the angle adjustment based on the inclination angle θ1 is reduced. Therefore, the inclination angle θ1 can be reduced while the range of the angle adjustment can be maintained. The small inclination angle θ1 can suppress the outer diameter of the sleeve. The small inclination angle θ1 can suppress the weight of the sleeve. When the outer diameter of the sleeve is small, the inner diameter of the hosel hole can be reduced. This contributes to the weight-reduction of the hosel part of the head. The weight-reduction of the hosel part increases design flexibility of a center of gravity of the head. The weight-reduction of the hosel part can contribute to the low center of gravity of the head.

In respects of the weight-reduction of the sleeve and of the weight-reduction of the hosel part, the inclination angle θ1 is preferably equal to or less than 2 degrees, more preferably equal to or less than 1.8 degrees, still more preferably equal to or less than 1.5 degrees, and yet still more preferably equal to or less than 1.2 degrees. In respect of increasing the range of the angle adjustment due to the circumferential position of the shaft, the inclination angle θ1 is preferably equal to or greater than 0.5 degree, and more preferably equal to or greater than 0.8 degree.

A material of the head body 14 is not restricted. As the preferable material, a metal, carbon fiber reinforced plastic (CFRP), and a combination thereof are exemplified. More preferably, the material is the metal. As the metal, a titanium alloy, stainless steel, an aluminum alloy, a magnesium alloy, and a combination thereof are exemplified. A manufacturing method of each of the members constituting the head body 14 is not restricted. As the manufacturing method, forging, casting, pressing, NC processing, and a combination thereof are exemplified. As described above, the pressing is preferable for the crown member 110, the face member 112, and the sole member 114.

A material of the shaft 6 is not restricted. As the material of the shaft, carbon fiber reinforced plastic (CFRP) and a metal are exemplified. A so-called carbon shaft and steel shaft can be suitably used. A structure of the shaft is not restricted.

A material of the sleeve 8 is not restricted. As the preferable material, a titanium alloy, stainless steel, an aluminum alloy, a magnesium alloy, and a resin are exemplified. In respects of strength and of lightweight, for example, the aluminum alloy and the titanium alloy are more suitable. It is preferable that the resin has excellent mechanical strength. For example, the resin is preferably a resin referred to as an engineering plastic or a super-engineering plastic.

A material of the engaging member 16 is not restricted. As the preferable material, a titanium alloy, stainless steel, an aluminum alloy, a magnesium alloy, and a resin are exemplified. It is preferable that the resin has excellent mechanical strength. For example, the resin is preferably a resin referred to as an engineering plastic or a super-engineering plastic. As described above, the engaging member 16 may be integrally formed with the head body.

A material of the screw 10 is not restricted. As the preferable material, a titanium alloy, stainless steel, an aluminum alloy, and a magnesium alloy or the like are exemplified.

The loft angle, the lie angle, and the hook angle can be measured by a known measuring device. As an example of the measuring device, a golf club head gauge manufactured by SHENG FENG ENTERPRISE CO. is exemplified. The values of the loft angle, the lie angle, and the hook angle are usually described in a product catalog. The loft angle is a real loft angle.

The original loft angle can be measured by a simple measuring instrument. As the measuring instrument, a protractor is exemplified. The protractor has been used in the technical field of the golf club from a long time ago. The original loft angle can be easily measured even during welding.

In the member with the hosel member 116 mounted (the joined body 300 or the like), at least one selected from the group consisting of the loft angle, the lie angle, and the hook angle can be measured by utilizing the hosel hole 18. For example, the at least one can be measured with a bar inserted into the hosel hole 18. Preferably, at least one selected from the group consisting of the loft angle, the lie angle, and the hook angle is measured by using a straight bar. The straight bar has a tip part having an outer diameter which is substantially the same as that of the inner diameter of the hosel hole 18.

EXAMPLES

Hereinafter, the effects of the present invention will be clarified by examples. However, the present invention should not be interpreted in a limited way based on the description of the examples.

Example

Adjustment 1

The same head body as the head body 14 described above was produced. A crown member was obtained by press processing a rolled material. A face member was obtained by press processing the rolled material. A sole member was obtained by press processing the rolled material. A hosel member was obtained by NC-processing pure titanium. "NC" implies "Numerical Control".

These members were welded through the step S1, the step S2 (including the step S21 and the step S22), the step S3, and the step S4. The local welding was spot welding (spot welding).

A golf club having the same structure as that of a golf club 2 shown in FIG. 3 or the like was produced by using the head body. A material of an engaging member was 6-4 titanium (Ti-6Al-4V). A weight of the engaging member was 1.5 g. A material of a screw was 6-4 titanium (Ti-6Al-4V). A weight of the screw was 1.0 g. The engaging member was welded to the head body. A through hole was opened at a position (an axial direction position) of a hosel member 116 to which the engaging member is fixed. The engaging member was welded to the hosel member 116 by utilizing the through hole.

A material of a sleeve was an aluminum alloy. A weight of the sleeve was 9 g. In the sleeve, the angle θ1 was set to 1.0 degree. A ferrule was fitted to a carbon shaft and then, a tip part of the shaft and the tip member were bonded to each other. A urethane bonding agent ("Esprene" (trade name) manufactured by Touritsu Kasei Industries, Ltd.) was used for the bond. The screw was inserted from a sole side, and the screw and the sleeve were engaged in a screwing manner to obtain a golf club according to example (adjustment 1).

Example

Adjustment 2

A golf club according to example (adjustment 2) was obtained in the same manner as in the example (adjustment 1) except that a lie angle was adjusted so that the lie angle was flatter than that of the example (adjustment 1) by 1 degree in the step S2.

Example

Adjustment 3

A golf club according to example (adjustment 3) was obtained in the same manner as in the example (adjustment 1) except that a real loft angle was adjusted so that the real loft angle was greater than that of the example (adjustment 1) by 1 degree in the step S1 and the step S2.

Example

Adjustment 4

A golf club according to example (adjustment 4) was obtained in the same manner as in the example (adjustment 1) except that a lie angle was adjusted so that the lie angle was higher than that of the example (adjustment 1) by 1 degree in the step S2.

Example

Adjustment 5

A golf club according to example (adjustment 5) was obtained in the same manner as in the example (adjustment 1) except that a real loft angle was adjusted so that the real loft angle was smaller than that of the example (adjustment 1) by 1 degree in the step S1 and the step S2.

Thus, all the five kinds of examples were manufactured from the same parts. The five kinds of heads were made the differences by only angle adjustment during welding.

In the five kinds of examples, angle adjustment of an axis line of a hosel hole was easily achieved by bending a welded portion in a spot-welded state.

Comparative Example

A first portion other than a sole and a sole portion were each produced by casting. The first portion and the sole portion were welded to each other to obtain a head body made of 6-4 titanium. A shape of the head body was made the same as that of the head body of the example (adjustment 1) except for an inner diameter of a hosel hole.

A sleeve was obtained in the same manner as in the example except that an outer diameter of an outer side of a shaft hole was increased and the inclination angle θ1 was set to 2 degrees. An outer diameter of the sleeve was reduced as much as possible in the same manner as in the example. However, the outer diameter of the sleeve became larger than that of the example. A weight of the sleeve was 11 g. A golf club of comparative example was obtained in the same manner as in the example by using the sleeve and the head body.

Specifications and evaluation results of the examples and the comparative example are shown in the following Table 1. The examples and the comparative example enable twelve kinds of circumferential positions in the relative relationship between the head and the shaft. The maximum value of twelve real loft angles measured in each of the examples and the comparative example is shown in Table 1. The minimum value of twelve real loft angles measured in each of the examples and the comparative example is shown in Table 1. Similarly, the maximum value of twelve lie angles is shown in Table 1, and the minimum value of the twelve lie angles is shown in Table 1. Similarly, the maximum value of twelve hook angles is shown in Table 1, and the minimum value of the twelve hook angles is shown in Table 1.

TABLE 1

Specifications and evaluation results of examples and comparative example

| | | Examples | | | | | Comparative |
|---|---|---|---|---|---|---|---|
| | Unit | Adjustment 1 | Adjustment 2 | Adjustment 3 | Adjustment 4 | Adjustment 5 | example |
| Angle adjustment during manufacturing head body | — | Standard | An axis line of a hosel hole was inclined by 1 degree in a direction where a lie angle is decreased. | An axis line of a hosel hole was inclined by 1 degree to a face side. | An axis line of a hosel hole was inclined by 1 degree in a direction where a lie angle is increased. | An axis line of a hosel hole was inclined by 1 degree to a back side. | — |
| Angle of inclination $\theta 1$ | degree | | | 1.0 | | | 2.0 |
| Weight of sleeve | g | | | 9 | | | 11 |
| Real loft angle, maximum value | degree | 12.7 | 12.7 | 13.7 | 12.7 | 11.7 | 13.3 |
| Real loft angle, minimum value | degree | 10.4 | 10.3 | 11.4 | 10.4 | 9.4 | 9.7 |
| Lie angle, maximum value | degree | 58.5 | 57.5 | 58.5 | 59.5 | 58.5 | 59.9 |
| Lie angle, minimum value | degree | 56.5 | 55.5 | 56.5 | 56.5 | 56.5 | 57.1 |
| Hook angle, maximum value | degree | 1.9 | 1.8 | 3.4 | 2.0 | 0.4 | 2.6 |
| Hook angle, minimum value | degree | −1.9 | −1.8 | −0.3 | −2.0 | −3.4 | −2.6 |
| Real loft angle, adjustment range | degree | | | 9.4~13.7 | | | 9.7~13.3 |
| Lie angle, adjustment range | degree | | | 55.5~59.5 | | | 57.1~59.9 |
| Hook angle, adjustment range | degree | | | −3.4~3.4 | | | −2.6~2.6 |

As shown in Table 1, the examples are superior to the comparative example. Examples provide a lightweight hosel part and a great angle adjustment range. The advantages of the present invention are apparent.

The invention described above can be applied to all golf club heads.

The description hereinabove is merely for an illustrative example, and various modifications can be made in the scope not to depart from the principles of the present invention.

What is claimed is:

1. A method for manufacturing a golf club head used for a golf club in which a head body and a shaft are detachably mounted to each other without destruction of a bonding agent, the method comprising the steps of:
   locally welding a face member and a sole member to each other to obtain a first joined body with an original loft angle measured; and
   locally welding the first joined body and a hosel member to each other to obtain a second joined body with one or more specifications selected from the group consisting of the original loft angle, a lie angle, and a hook angle measured;
   welding a crown member to the second joined body to obtain a third joined body; and,
   in order to complete welding, additionally welding a locally welded portion of the third joined body.

2. The method according to claim 1, wherein the sole member has a through hole; and
   the step of obtaining the second joined body comprises the steps of:
   fitting a lower end part of the hosel member into a through hole of the sole member to position the hosel member; and
   welding the hosel member and the sole member to each other with the hosel member positioned.

3. A method for manufacturing a golf club head used for a golf club in which a head body and a shaft are detachably mounted to each other without destruction of a bonding agent, the method comprising the steps of:
   preparing a member having a hosel hole and a member having a through hole;
   fitting a lower end part of the member having the hosel hole into the through hole; and
   welding the member having the hosel hole and the member having the through hole to each other with the lower end part of the member having the hosel hole fitted into the through hole.

4. The method according to claim 3, wherein a sole hole is formed in a sole part;
   the head body and the shaft are detachably mounted to each other by a screw inserted from the sole hole; and
   the sole hole is formed by utilizing the through hole.

5. The method according to claim 2, wherein the hosel member has a projection; and the projection is brought into contact with an inner surface of the sole member in positioning the hosel member.

6. The method according to claim 2, wherein a lower part of the hosel member forms a projection part outwardly extending from an outer surface of the sole member with the hosel member positioned and the outer surface of the sole member and the lower end surface of the hosel member are smoothly continued by removing the projection part.

7. The method according to claim 6, wherein the projection part is removed by polishing.

8. The method according to claim 1, further comprising the step of adjusting the specification in the second joined body.

* * * * *